United States Patent [19]

Wilson

[11] 4,164,947
[45] Aug. 21, 1979

[54] ROTOR FOR AN AXIAL FLOW ROTARY SEPARATOR

[75] Inventor: John E. Wilson, Colona, Ill.

[73] Assignee: Deere & Company, Moline, Ill.

[21] Appl. No.: 885,305

[22] Filed: Mar. 10, 1978

[51] Int. Cl.² ............................................. A01F 12/20
[52] U.S. Cl. .............................. 130/27 HA; 130/27 T
[58] Field of Search ............. 56/14.6; 130/27 R, 27 H, 130/27 HA, 27 T

[56] References Cited

U.S. PATENT DOCUMENTS

| | | | |
|---|---|---|---|
| 2,266,806 | 12/1941 | Ronning | 130/27 HA |
| 3,259,134 | 7/1966 | Stokland | 130/27 H |
| 3,481,344 | 12/1969 | Stokland | 130/27 R |
| 3,664,100 | 5/1972 | Rowland-Hill | 56/14.6 |
| 3,982,548 | 9/1976 | Stamp et al. | 130/27 HA |
| 3,995,645 | 12/1976 | Rowland-Hill | 130/27 T |

Primary Examiner—Russell R. Kinsey

[57] ABSTRACT

The rotor of an axial flow rotary combine separator includes contiguous upstream threshing and downstream separating portions in each of which circumferentially spaced axially extending processing bars (threshing and separating respectively) are mounted. Between adjacent processing bars are mounted axially extending mover bars whose configuration differs substantially from that of the processing bars and whose primary function is to maintain uniform axial indexing of crop material through the separator as the rotor rotates and the material is processed.

14 Claims, 6 Drawing Figures

ROTOR FOR AN AXIAL FLOW ROTARY SEPARATOR

BACKGROUND OF THE INVENTION

The present invention relates generally to axial flow rotary separators for threshing and separating grain crops and the like, of a type typically embodied in a combine and more particularly to the threshing and separating sections of rotors for such machines.

As is well known and typical of such separators, a rotor rotates in a stationary housing which includes grate portions and an upstream inlet for receiving harvested crop material. Threshing and separating of grain take place as the crop material is conveyed, through interaction between rotor and housing, spirally downstream through the separator in the annular space between the rotor and the housing. Threshed grain and chaff is expelled through the grate or grates and straw is discharged from the downstream end of the separator.

Typically, rotors carry generally axially extending threshing and separating bars while the inside surfaces of the housing and grates are provided with members to effect an axial indexing or conveying of the material, such as raised helical ribs, either continuous or interrupted. However, in axial flow separators relying upon such fixed and passive lead members, it has been found that material flow is often uneven and inconsistent so that threshing and separating efficiency are adversely affected and it is known to modify threshing and separating bars so that they also have an axial indexing effect in an attempt to improve material conveying and control. For example, the individual ribs of a threshing rasp bar may be appropriately angled or the threshing and separating bars themselves may be disposed helically rather than axially on the rotor. However, in attempting to combine the functions of threshing or separating and conveying in one rotor member, the efficiency of one or both functions must be compromised because the physical characteristics of rotor elements required for each function differ. For example, it is known that on a threshing rotor, threshing bars with ribs or blades fine enough to produce the best threshing results are only marginally effective as conveyors, even if the blades are suitably angled. And in the separating portion, axially extending bars are most efficient in separating but of course have no direct conveying effect.

SUMMARY OF THE INVENTION

Accordingly, it is an object of the present invention to enhance the direct contribution made by rotor elements in providing the uniform, positive and consistent material flow and control necessary in a given axial flow rotary separator if the highest possible threshing and separator efficiencies are to be achieved. It is a further object of the invention to provide rotor means for improving material flow and control which also themselves effect some separation. It is a feature of the invention to provide on the rotor, between functionally specialized processing bars (threshing or separating), elements whose principal function is material conveying and control. An advantage of such an arrangement is that the design of both the processing bars and the conveying and control bars can be optimized for their respective functions.

It is a feature of the invention that the effectiveness of the processing bars may be improved by designing the material conveying and control bars or material movers so that, as well as conveying, they tend to agitate and reorient crop material in the intervals between its encounters with successive processing bars as the rotor rotates. Material movers in the threshing section, for example, as well as conditioning crop material in advance of its engagement by the threshing bars, also increase separator capacity by themselves having a direct separating effect.

It is an advantage of the invention that having the rotor take a more direct part in imparting the conveying or axial indexing force results in a net reduction of circumferential frictional force imposed on the rotor by the crop material in the annular space between rotor and housing and hence in a reduction of specific power consumption by the separator.

It is also within the scope of the invention to provide a material mover carried by the rotor and extending through both the threshing and separating sections of the separator.

Another feature of the invention is to provide in an axial flow threshing rotor, between circumferentially spaced threshing bars such as rasp bars or the like, mover bars having coarse widely spaced, side-by-side mover blades each blade helically disposed with respect to the rotor axis.

DESCRIPTION OF THE PREFERRED EMBODIMENT

Figure 6:
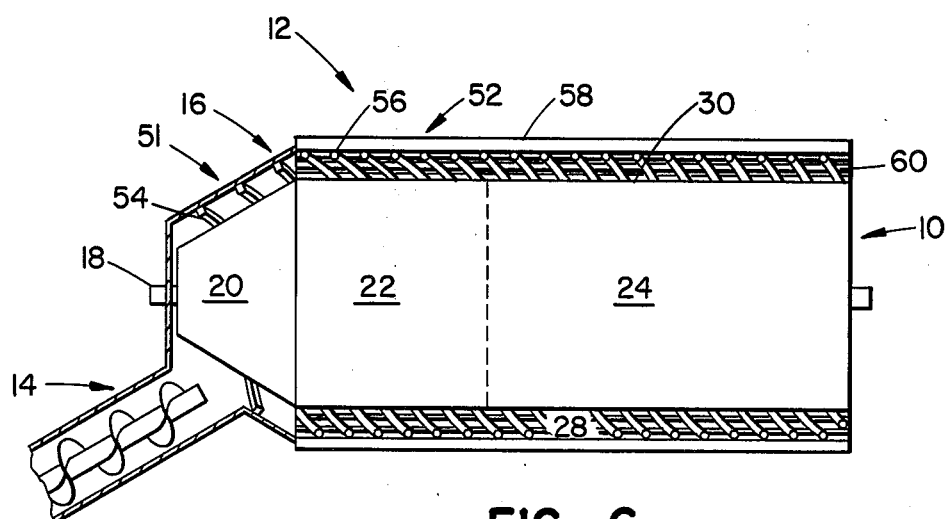
FIG. 6 is a semi-schematic side elevation of a separator and feeder house embodying the invention.

The invention is embodied in a rotor 10 of a separator 12 shown schematically in FIG. 6 of an axial flow rotary combine. The combine (not shown in the drawings) is conventional in that it includes a forward mounted gatherer for gathering the crop as the combine advances over a field, a feeder house 14 for transferring the gathered crop to the separator, means for cleaning and discharging the grain separated from the crop and means for discharging straw from the separator.

The separator 12 is disposed generally fore-and-aft in the combine and includes a fixed housing 16 in which the rotor is rotatably supported by a shaft 18. The rotor 10 includes three functional portions: generally frusto-conical infeed 20, and generally cylindrical threshing 22 and separating 24, from front to rear or upstream to downstream, respectively.

Figure 1:
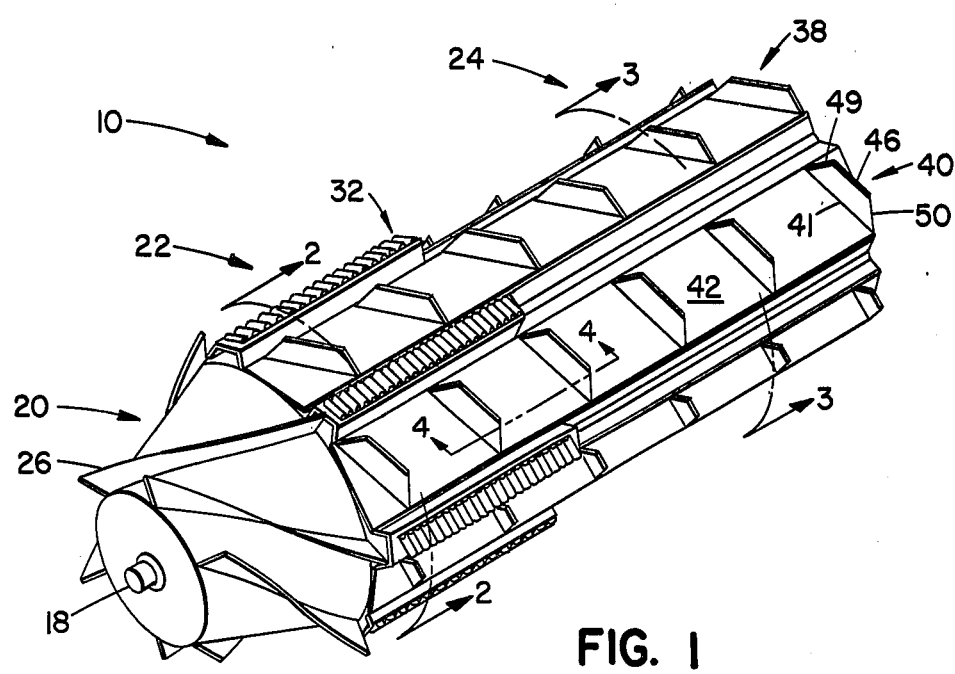
FIG. 1 is a semi-schematic left front perspective view of a rotor for an axial flow rotary separator embodying the invention.

The infeed rotor portion 20 includes suitable material control elements indicated schematically by the helical flights 26 shown in FIG. 1 for receiving crop material from the feeder house and delivering it into the annular space 28 between rotor and housing, at the inlet to the threshing portion of the separator.

In the threshing and separating portions the rotor includes a frame member such as the cylindrical body 30, for supporting rotor functional elements.

Figure 2:
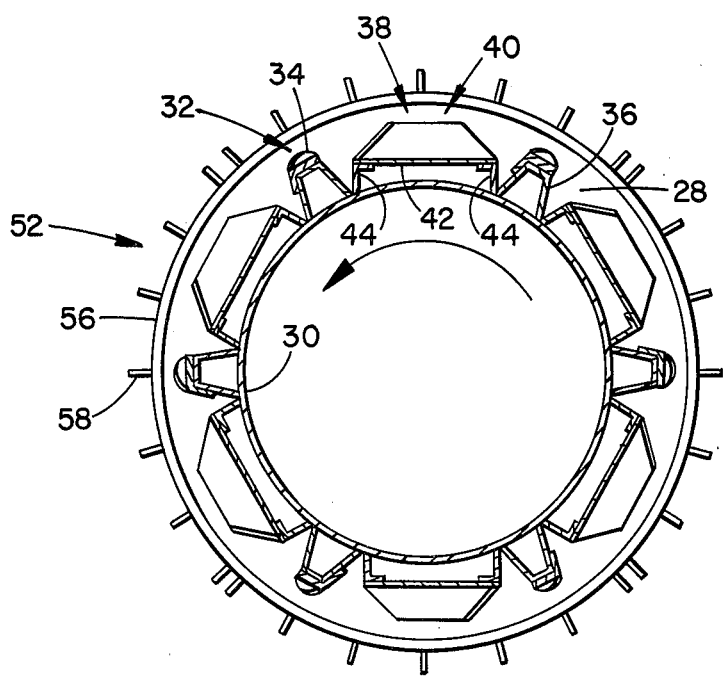
FIG. 2 is a semi-schematic cross sectional view through the threshing section of the rotor of FIG. 1 approximately on line 2—2 of FIG. 1 and with the threshing grate surrounding the rotor added.
Figure 4:
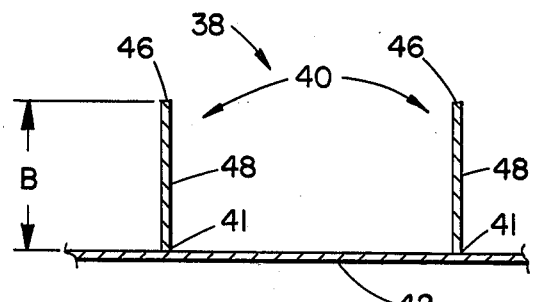
FIG. 4 is a partial cross sectional view on line 4—4 of FIG. 1 showing the relative height and spacing of the mover bar blades.

The threshing portion 22 of the rotor includes six equally circumferentially spaced conventional rasp bars 32 each bar having a series of angled side-by-side closely spaced raised ribs 34 and being mounted on a rasp bar support 36 attached rigidly to the rotor cylindrical body 30 as indicated in FIG. 2. Between each adjacent pair of rasp bars 32 is a material mover bar 38 extending from the forward end of the threshing section 22 to the rearward end of the separating section 24. Each mover bar 38 includes a plurality of axially spaced radially extending mover blades 40 attached rigidly at a blade inner edge 41 to a mover support plate or floor 42 which is in turn attached rigidly to the rotor cylindrical body 30 by means of a pair of opposite mover bar supports 44. Each mover blade 40 has an outer working edge 46 and a forwardly directed (with respect to rotor rotation) radially extending working surface 48 as indicated in FIG. 4 and is mounted at a helical or lead angle to the axis of the rotor so that with respect to rotor rotation there is a fore or leading part 49 and a hind or trailing part 50.

The housing 16 includes a forward imperforate or solid frusto-conical infeed portion 51 indicated only in FIG. 6, and a foraminous grate portion 52, the latter extending over both the threshing 22 and separating 24 portions of the rotor. Raised helical guide or lead members 54 are mounted on the inside of the infeed housing 51. The grate 52 includes spirally arranged rod members 56 supported and spaced by axially extending grate bars 58. As can be seen in FIGS. 2 and 6, the spiral rods 56 are carried substantially radially inside of the inner edge of the axial bars 58 creating a relatively low friction inner grate surface with a positive or downstream leading effect. The downstream end of the housing (grate 52) is open, providing an outlet 60 for straw after threshing and separating.

Figure 3:
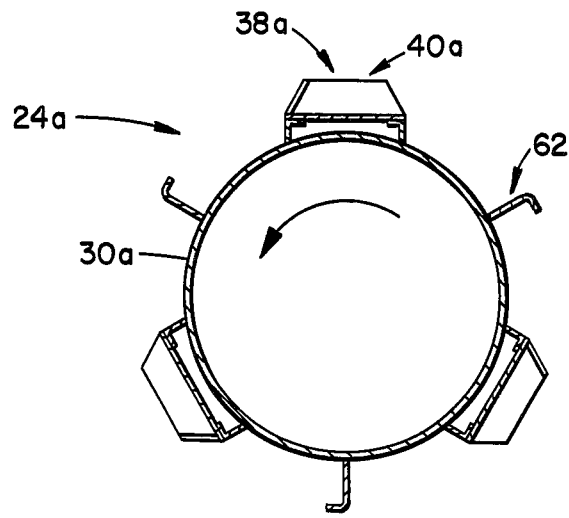
FIG. 3 is a semi-schematic cross sectional view of the separating portion of a rotor including an alternate embodiment of the invention and similar to a view on line 3—3 of FIG. 1.

FIG. 3 illustrates an alternative embodiment of the invention comprising a separating rotor portion 24a having only three equally spaced mover bars 38a similar to the mover bars 38 described above and, rigidly attached to a rotor body 30a between each pair of mover bars, a radially extending separator paddle 62 extending axially the length of the separating portion 24a of the rotor.

In operation, the combine advances over a field and gathers crop material and delivers it by way of the feeder house 14 to the forward part of the separator 12 for engagement by the infeed rotor portion 20. Co-action between the rotor and the helical lead members 54 of the infeed housing 51, acting on the crop material propels it spirally rearwards and into the relatively thin annular space 28 between the grate 52 and rotor threshing portion 22 in the threshing portion of the separator.

In the threshing section 22 of the rotor the functional elements, rasp bars 32 for processing the crop material and material mover bars 38 primarily for conveying or moving and controlling it, are highly differentiated in form and function. Between the rasp bars 32 and the grate 52 crop material is rubbed or rasped, the crop material tending to ride over the crests of the ribs 34, so that grain is removed from the ears and separation begins, resulting in expulsion of grain and chaff through the grate 52 for delivery to the cleaning means (not shown). For efficient threshing (a processing function) the individual ribs 34 of the rasp bar are preferably so closely spaced that even though they may be angled (with respect to the rotor axis) they cannot effectively bite the crop material and their axial deflecting or indexing effect on it is very small in relation to the net overall axial indexing rate required. A balanced and consistent material flow rate is preferably obtained with active mover elements on the rotor, such as the material mover bars 38 or 38a disclosed here rather than relying on the more passive conveying obtained when a rotor propels crop material through contact with fixed lead members on the inside of a housing. Thus the coarse, relatively high and widely spaced mover blades 40 of the mover bars and particularly their working edges 46 and working surfaces 48 positively engage the crop material but, because of friction between the crop material and the grate 52 as the rotor rotates, rotational speed of the crop material is less than that of the rotor periphery. Thus there is relative circumferential motion between the crop material and the mover blades 40 and "slippage" will occur between the crop material and angled features such as the working edges 46 and working surfaces 48 of the mover blades, deflecting the material downstream or axially rearward so that the path of the crop material is a rearward spiral, the actual path resulting from the combined effects of the mover bars 38 and spiral lead members (rods 56) of the grate 52. Depending on a number of variables such as separator loading (portion of its total capacity being used), rotor speed, etc., the support plate 42, adjacent the blade inner edge 41, will serve as a floor cooperating to a greater or lesser extent with the working surface 48 in material control. The principal function of the mover bars 38 is to maintain axially rearward indexing of the material but the relatively wide axial spacing between blades and their height does permit some tumbling and reorientation of the crop material which assists separation. Separation of the threshed crop is completed by the separator portion 24 of the rotor in cooperation with the surrounding rearward portion of the grate 52. Very efficient separation (another processing function) is achieved by the alternative type of rotor arrangement shown in FIG. 3 where highly effective axially and radially extending separator paddles 62 alternate on the rotor with mover bars 38a similar to the mover bars 38 described above. (Radial separating bars may, of course, be mounted between the material mover bars 38 in the rotor separating portion 24 of FIG. 1 but are not shown in the drawings.) Here again the processing and conveying or moving functions are separated, the axially extending separator paddles 62 making no direct contribution to axial indexing while the mover bars 38a maintain the axial flow of material with a secondary separating effect.

Figure 5:
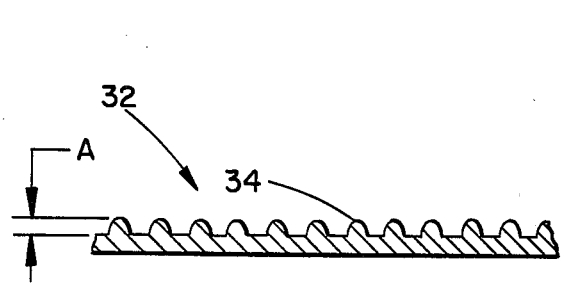
FIG. 5 is a partial longitudinal cross sectional view showing the relative height and spacing of the ribs of a rasp bar included in the threshing section.

It will be noted that in the threshing section, the configurations of the rasp bars 32 and mover bars 38 are similar to the extent that both include axially extending arrays of raised rib-like elements disposed side-by-side each with a lead angle and, preferably, with radial clearances between the grate or housing 52 and both the rasp bars 32 and mover bars 38 being about equal. The widely differentiated functional characteristics of the elements result from their respective sizing and spacing dimensions. Successful operating results have been obtained, for example, with dimensions of the following order: in separators having rotors of 500–900 millimeters diameter, having threshing sections 900–1250 millimeters long and separating sections 1250–1500 millimeters long, rotated at circumferential speeds of up to about 45 meters per second and having radial clearances between housing or grate and rotor elements of about 10–15 millimeters (for small grain; more for corn) and with rasp bar ribs 34 and mover bar blades 40 having lead angles (measured from a circumferential direction) of about 15°–30°, dimensions ranges for the rasp bar ribs 34 and the mover blades 40, respectively, were about: height 9–14 millimeters (dimension A in FIG. 5) and 40–110 millimeters (dimension B in FIG. 4), true length 60–90 and 100–250 millimeters and axial spacing 17–20 and 100–200 millimeters. As an example, a successful particular combination of dimensions from the above ranges for use in small grains such as wheat included: a rotor having six rasp bars 32 and six material mover bars 38 and a rotor diameter of 700 millimeters with threshing and separating section lengths of 1000 and 1400 millimeters respectively, and rotated to give a peripheral speed of 30 meters/second and having a rotor to grate clearance of 15 millimeters; rasp bar rib 34 and mover blade 40 lead angles both 30°; rasp bar rib and mover blade dimensions respectively—height 10 and 75 millimeters, length 75 and 150 millimeters, axial spacing 20 and 150 millimeters.

It will be understood that although in the embodiments here described the separate processing and material control and moving bars are axial extending and on a cylindrical rotor it would be entirely within the scope of the invention for the functional bars to be helically extending and/or carried on a rotor of non-cylindrical form such as frusto-conical. It will be understood, too, that in separators having smaller diameter rotors (as for example in a multi-rotor separator) a smaller number of bars may be necessary in order to maintain circumferential spacing of the bars and circumferential dimensions of the elements of the bars in proportion to the physical characteristics of the crop material to be handled.

I claim:

1. In an axial flow rotary separator for processing crop material, including a housing having walls, said walls including a foraminous portion and an inlet for receiving crop material and an outlet axially spaced downstream from the inlet, and a rotor mounted for rotation in the housing and disposed so as to create in cooperation with the housing an annular space extending between the inlet and the outlet, said rotor having a frame and an upstream threshing portion and a downstream separating portion, said threshing portion having at least two circumferentially spaced threshing bars carried by the frame, each bar including a plurality of axially spaced raised ribs and said separating section having at least two circumferentially spaced separating bars carried by the frame, the improvement in the rotor comprising:

a plurality of axially spaced material mover blades carried by the frame circumferentially spaced from the threshing bars, each blade being of substantially greater radial extent than the threshing bar ribs and having a working surface and being disposed substantially athwart the direction of rotation and said working surface having with respect to the direction of rotation a leading portion and a trailing portion, said leading portion being disposed upstream of the trailing portion and the axial spacing of the blades being substantially greater than the axial spacing of the threshing bar ribs so that crop material in the annular space engaged by the working surface is deflected downstream.

2. The invention defined in claim 1 wherein each separating bar includes a continuous blade for engaging the crop material and extending continuously through the separator section and further including a second plurality of axially spaced mover blades carried by the frame circumferentially spaced from the separating bars, each blade being of substantially greater radial extent than the threshing bar ribs and having a working surface and being disposed substantially athwart the direction of rotation and said working surface having, with respect to the direction of rotation, a leading portion and a trailing portion, said leading portion being disposed upstream of the trailing portion and the axial spacing of the blades being substantially greater than the axial spacing of the threshing bar ribs so that crop material in the annular space engaged by the working surface is deflected downstream.

3. A threshing rotor for an axial flow rotary separator including a housing in which crop material is displaced axially downstream from a crop material receiving inlet towards a crop material discharge outlet comprising:

a frame;

at least two circumferentially spaced threshing bars carried by the frame, each bar including a plurality of closely axially spaced threshing elements;

a material mover bar carried by the frame circumferentially spaced from the threshing bars, the material mover bar having a plurality of axially spaced blades, each blade being disposed athwart the direction of rotor rotation and having, with respect to said rotation, a leading portion and a trailing portion with the leading portion being disposed upstream of the trailing portion, the axial spacing of the mover bar blades being substantially greater than that of the threshing elements so that crop material engaged by the blades is propelled downstream within the housing.

4. The invention defined in claim 3 wherein each threshing element comprises a generally radially extending rib and the radial height of the material mover blades is at least approximately twice the radial height of the ribs of the threshing bar.

5. The invention defined in claim 3 wherein each material mover blade is radially extending and has a radially outward edge conforming approximately to a portion of a helix centered on the rotor axis.

6. The invention defined in claim 3 wherein the radial distances from the rotor axis to the radially outermost portions of the threshing bars and material mover bars, respectively, are approximately equal.

7. In an axial flow rotary separator having a generally cylindrical housing including a grate, said housing having an inlet and an outlet axially spaced downstream from the inlet, crop material being received at the inlet and processed while being propelled spiral fashion towards the outlet, an improved rotor mounted for rotation within the housing in a crop threshing and separating relationship with the grate and comprising:
- a frame having an upstream threshing portion and a contiguous downstream separating portion;
- a plurality of generally axially extending circumferentially spaced threshing bars, each having an upstream end, carried by the threshing portion of the frame;
- a plurality of generally axially extending circumferentially spaced separating paddles, each having a downstream end, carried by the separating portion of the frame;
- a plurality of generally axially extending material mover bars carried by the frame between the threshing bars and separating paddles respectively, each material mover bar having a plurality of spaced generally radially extending material moving blades, each blade having, with respect to the direction of rotation of the rotor, a leading edge and a trailing edge offset downstream from the leading edge so that crop material engaged by the blades is deflected downstream towards the outlet.

8. The invention defined in claim 7 wherein at least one material mover bar extends from the upstream end of at least one threshing bar to the downstream end of at least one separating paddle.

9. In an axial flow rotary separator for processing agricultural crop material as it is moved spiral fashion through a housing from an upstream inlet to a downstream outlet, an improved rotor mounted for rotation in the housing and having upstream and downstream ends adjacent the inlet and outlet respectively, comprising:
- a frame;
- at least two elongated circumferentially spaced raised crop material processing elements carried by the frame for engaging the crop material in the housing and processing it as the rotor rotates;
- an elongated array of spaced material moving elements carried by the frame axially overlapping and circumferentially spaced from the processing elements for engaging crop material in the housing and moving it downstream as the rotor rotates.

10. In an axial flow rotary separator for processing agricultural crop material as it is moved through a housing from an upstream inlet to a downstream outlet, an improved rotor mounted for rotation in the housing and having upstream threshing and downstream separating portions comprising:
- a frame;
- at least two elongated raised threshing elements extending in the threshing portion and having opposite upstream and downstream ends;
- an elongated raised material control bar having a downstream end adjacent the downstream end of the separating portion and an upstream end extending at least partially into the threshing portion and circumferentially spaced from the downstream end of the threshing element.

11. The invention defined in claim 10 wherein the material control bar includes a plurality of spaced angled material moving elements, each engageable with the crop material for urging it downstream.

12. An elongated rotor for an axial flow rotary separator in which a generally cylindrical housing surrounds the rotor and is spaced radially from it so as to provide a working clearance between the radial extremities of the rotor and the radially innermost portions of the housing and in which agricultural crop material is processed as it is moved axially by the rotor comprising:
- a frame;
- at least two elongated circumferentially spaced material processing bars carried by the frame;
- an elongated array of spaced raised angled material moving blades carried by the frame and axially overlapping and circumferentially spaced from the processing bars, each blade having a radially outward working edge and a radially inward inner edge, each working edge being helically disposed so that material engaged by it is moved axially as the rotor rotates, the radial distance between the respective working and inner edges of said blades being at least twice the amount of the working clearance and the axial spacing between said blades being at least three times the working clearance.

13. The invention defined in claim 12 wherein the array of material moving blades is generally axially extending.

14. The invention defined in claim 12 wherein the material processing bars are threshing bars.

* * * * *

Disclaimer 4,164,947.—*John E. Wilson,* Colona, Ill. ROTOR FOR AN AXIAL FLOW ROTARY SEPARATOR. Patent dated Aug. 21, 1979. Disclaimer filed Mar. 6, 1981, by the assignee, *Deere & Co.*

Hereby enters this disclaimer to all the claims, 1–14 of said patent.

[*Official Gazette May 12, 1981.*]